United States Patent [19]

Cronce et al.

[11] Patent Number: 5,025,967
[45] Date of Patent: Jun. 25, 1991

[54] SNAP-TOGETHER LUGGAGE CARRIER SLAT

[75] Inventors: Gary M. Cronce, Port Huron; William Rasor, Goodells; Dean Graboske, Romeo, all of Mich.

[73] Assignee: Huron/St. Clair Incorporated, Port Huron, Mich.

[21] Appl. No.: 348,346

[22] Filed: May 5, 1989

[51] Int. Cl.⁵ .............................................. B60R 9/00
[52] U.S. Cl. .................................. 224/326; 224/325; 224/309
[58] Field of Search ............... 224/309, 317, 325, 326, 224/327, 324, 329-331

[56] References Cited

U.S. PATENT DOCUMENTS

| | | | |
|---|---|---|---|
| 4,030,647 | 6/1977 | Rasor et al. | 224/325 |
| 4,170,322 | 10/1979 | Bott | 224/326 |
| 4,281,783 | 8/1981 | Ingram | 224/325 |
| 4,343,419 | 8/1982 | Mareydt | 224/326 |
| 4,406,386 | 9/1983 | Rasor | 224/321 |
| 4,440,333 | 4/1984 | Bott | 224/324 |
| 4,473,178 | 9/1984 | Bott | 224/324 |
| 4,500,020 | 2/1985 | Rasor | 224/321 |
| 4,501,386 | 2/1985 | Rasor et al. | 224/326 |
| 4,516,710 | 5/1985 | Bott | 224/324 |
| 4,767,040 | 8/1988 | Miller et al. | 224/326 |
| 4,842,176 | 6/1989 | Stapleton | 224/326 |

Primary Examiner—Henry J. Recla
Assistant Examiner—David J. Walczak
Attorney, Agent, or Firm—Edgar A. Zarins; Malcolm L. Sutherland

[57] ABSTRACT

An end piece of a support slat of a luggage carrier which facilitates attachment of the end piece to the slat body prior to mounting to the vehicle body. The end piece has a tongue which extends into the slat body. The tongue includes a snap-in ramp designed to cooperate with an opening formed in the floor of the slat body to prevent withdrawal of the end piece and a series of alignment flanges extending upwardly from the tongue to engage the rub strip retaining shoulders of the slat body. A separate fastener is used to secure the slat assembly to the vehicle body.

6 Claims, 2 Drawing Sheets

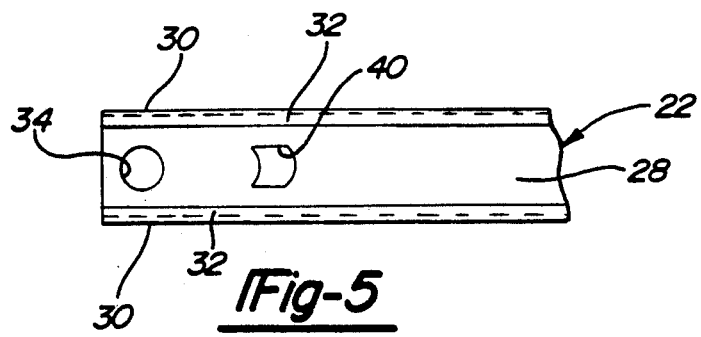
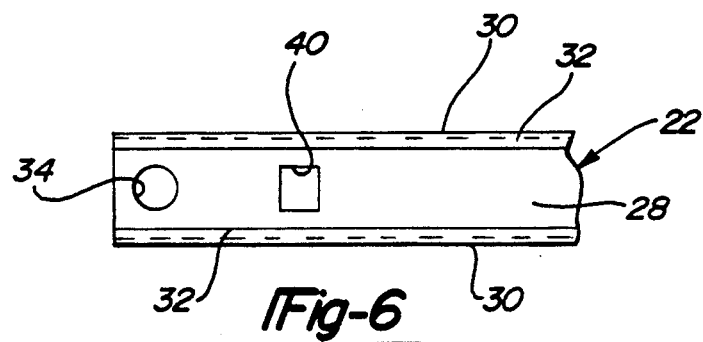
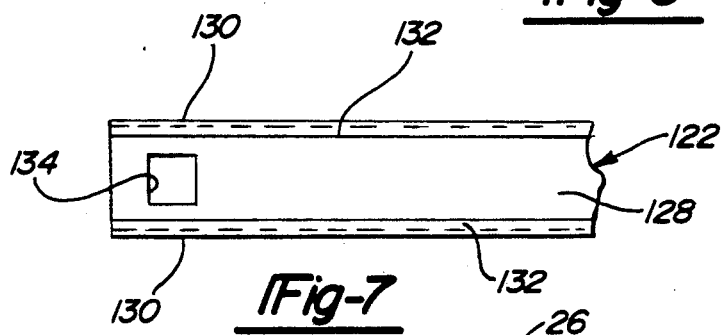
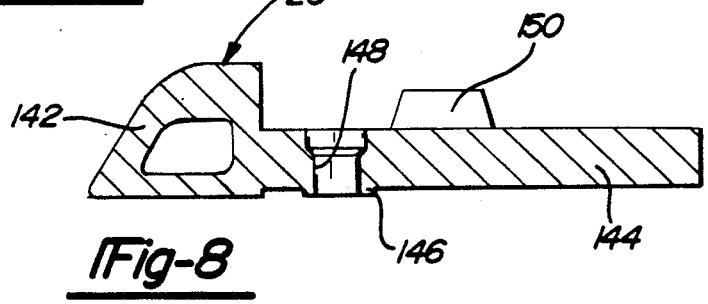
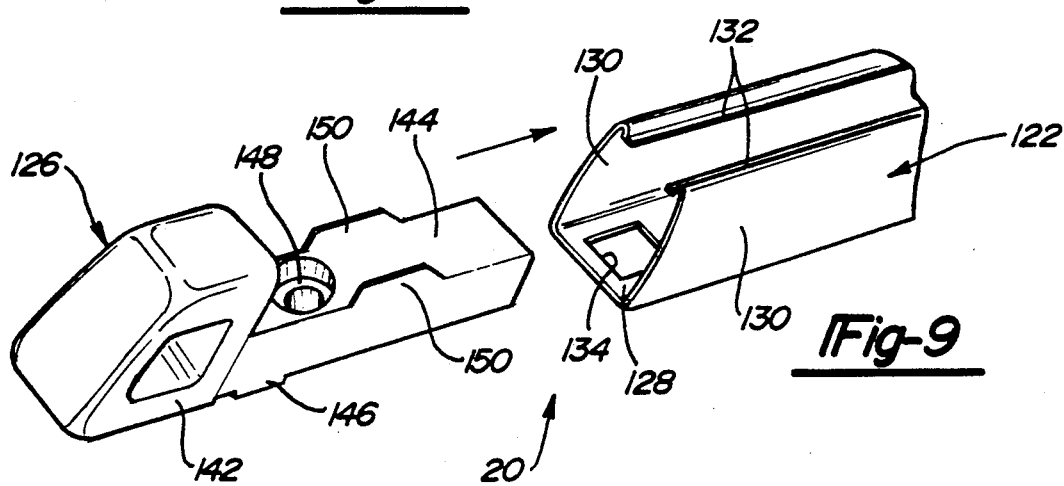

SNAP-TOGETHER LUGGAGE CARRIER SLAT

BACKGROUND OF THE INVENTION

1. Field of the Invention

This invention relates to a load supporting slat for a vehicle luggage carrier and, in particular, to a slat having a snap-in end piece for preattachment of the end piece prior to mounting to the vehicle.

2. Description of the Prior Art

It has become desirable to install luggage carriers on motor vehicles both during original manufacture of the vehicle or as an add-on by the vehicle dealer or owner. Most article carriers include various components including load-bearing slats which may consist of a slat body, a rub strip and end pieces to enclose the slat. However, handling and assembling multiple components can increase costs and result in lost components. As a result, various means of "pre-attaching" the end piece to the slat body have been developed such that the slat and end piece can be simply mounted to the vehicle.

In one example, underlying fasteners are used to attach the end piece to the slat body during manufacture of the carrier. However, this requires additional machining to receive the fastener. Another prior known device utilizes a flexible tang formed in the slat body and engageable with an opening in the end piece to prevent removal of the end piece. In the event the end piece needs to be separated from the slat body either the end piece or the slat would have to be deformed to separate the tang from the opening. Moreover, these assemblies do not provide means for preventing misalignment of the end piece relative to the slat body. Once the end piece becomes misaligned the fastener used to secure the slat to the vehicle cannot be automatically fed through the receiving openings in the end piece and slat body. Some prior known slat assemblies avoid this by molding the fastener directly into the end piece.

In an attempt to prevent rotation or misalignment, end pieces have been developed which include a downwardly depending stud element adapted to be matingly received within a correspondingly configured aperture in the floor of the slat body. Both the stud and the aperture have corresponding rectangular configurations such that once the stud is received within the aperture rotation is prevented as a result of the mating cooperation. However, in order to prevent such misalignment the stud and aperture must be closely matched requiring close manufacturing tolerances.

SUMMARY OF THE PRESENT INVENTION

The present invention overcomes the disadvantages of the prior known load bearing slat assemblies by providing a pre-attachable end piece which simply snaps together with the slat body. The end piece includes means for preventing inadvertent separation of the end piece from the slat body and means for preventing misalignment of the end piece within the slat body such that the slat can be readily mounted to the vehicle surface.

The slat assembly generally comprises a slat body having a top opening adapted to receive a rub strip and at least one end piece which is matingly received within the ends of the slat body to enclose the slat assembly. The slat body includes side walls and a bottom wall or floor having at least one aperture through which the mounting fastener will extend. The floor of the slat body may also include a second opening forming part of the means for preventing withdrawal of the end piece. The opening is adapted to receive a retaining ramp formed on the bottom of the end piece preventing inadvertent withdrawal of the end piece. However, the ramp can be accessed through the bottom of the slat body to facilitate disassembly if desired. Alternatively, in the single opening arrangement the end piece is provided with a boss in conjunction with the fastener bore which is received in the opening in the floor of the slat body.

The end piece preferably comprises an outer body, such as a tie loop, and an integrally formed tongue which is inserted into the slat body upon assembly. The fastener bore and the downwardly depending boss are formed in the tongue such that they can engage the slat body. Additionally, the end piece tongue is provided with at least one flange extending upwardly from the tongue which engage the slat body to maintain alignment of the end piece since the single boss would allow the end piece to rotate thereabout. The flanges extend upwardly to engage the underside of the retaining shoulders of the slat body thereby maintaining proper alignment within the slat body.

Once the end piece is attached to the slat body the slat can be mounted to the vehicle body using a fastener which extends through the bore of the end piece and the opening in the floor of the slat body. Thereafter, the rub strip can be inserted into the top opening in slat body to enclose the end piece tongue and fasteners. Thus, the present invention simplifies assembly and eventual mounting of the load-bearing slats of the luggage carrier.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 5 is a top plan view of the slat body of the first embodiment;

FIG. 6 is a top plan view of the slat body of a second embodiment;

FIG. 7 is a top plan view of the slat body of a third embodiment;

FIG. 8 is a cross-sectional perspective of the end piece of the third embodiment; and FIG. 9 is an exploded perspective of the third embodiment of the slat of the present invention.

DETAILED DESCRIPTION OF A PREFERRED EMBODIMENT OF THE PRESENT INVENTION

Figure 1:
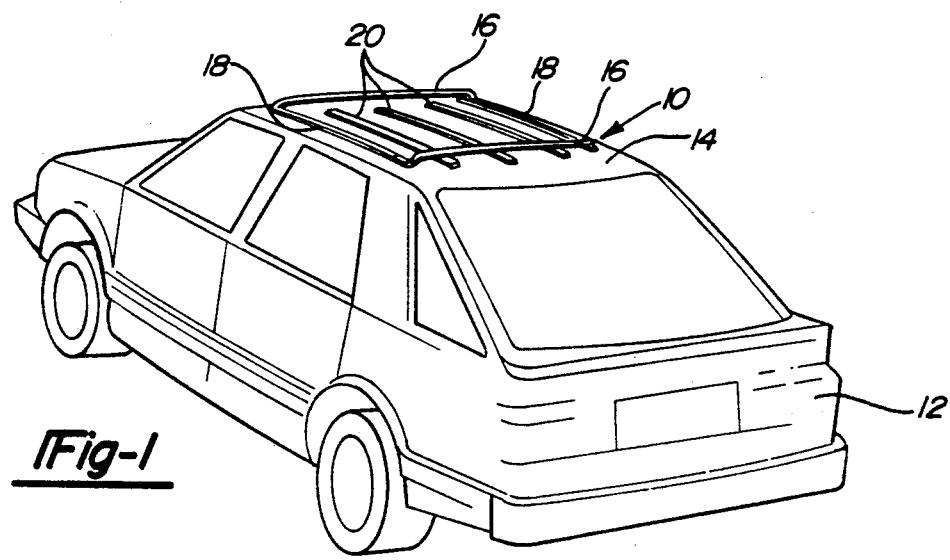
FIG. 1 is an elevated perspective of a vehicle having a luggage carrier embodying the slat construction of the present invention.

Referring first to FIG. 1, there is shown an article carrier 10 mounted to a vehicle 12. The carrier 10 is adapted to be mounted to the roof surface 14 of the vehicle 12 or to a lower deck surface. The carrier 10 may include one or more cross rails 16 to prevent longitudinal shifting of the load and raised or flush side rails 18 to form a frame. In order to support the articles within the carrier, a plurality of load-bearing slats 20 embodying the present invention are provided. The slats 20 are mounted directly to the vehicle surface 14 in parallel longitudinal arrangement.

A first embodiment of the load-bearing slat 20 is shown in FIGS. 2 through 5. The slat generally comprises an elongated slat body 22, an elastomeric rub strip 24 received within the slat body 22 to prevent contact between the luggage and slat body 22, and an end piece 26 received within at least one end of the slat body 22 to enclose the load-bearing slat 20. The end piece 26 may be in the form of a tie loop as shown or a stanchion for supporting a cross rail 16. The end piece 26 and slat body 22 construction embodying the present invention facilitates assembly of the slat 20 prior to attachment to the vehicle surface 14 in order to reduce manufacturing costs. Preferably, the end piece 26 is integrally molded of a plastic material while the slat body 22 can be either extruded or roll-formed. In a preferred embodiment, an insulator 27 is provided between the slat body 22 and the vehicle surface 14.

The slat body 22 includes a base wall 28 and a pair of side walls 30 extending generally upwardly from the base wall 28 to form a channel-like member. The side walls 30 include retaining shoulders 32 formed at the upper end of the side walls 30 for receiving and securing the rub strip 24. Formed proximate the end of the slat body 22 in the base wall 28 is an aperture 34 for receiving a fastener 36 to secure the slat 20 to the vehicle surface 14 as will be hereinafter described. The fastener 36 preferably engages a well nut 38 positioned below the surface 14. Additional fasteners 36 may be used to secure the slat 20 at positions along the length of the slat body 22. In the first embodiment of the present invention, the base wall 28 of the slat body 22 also includes an opening 40 spaced longitudinally from the aperture 34 for receiving a boss means of the end piece 26. The opening 40 may have either a substantially rectangular configuration as shown in FIG. 6 or a semi-circular configuration with a pair of parallel longitudinal edges and a pair of semi-circular lateral edges as shown in FIG. 5.

Figure 2:
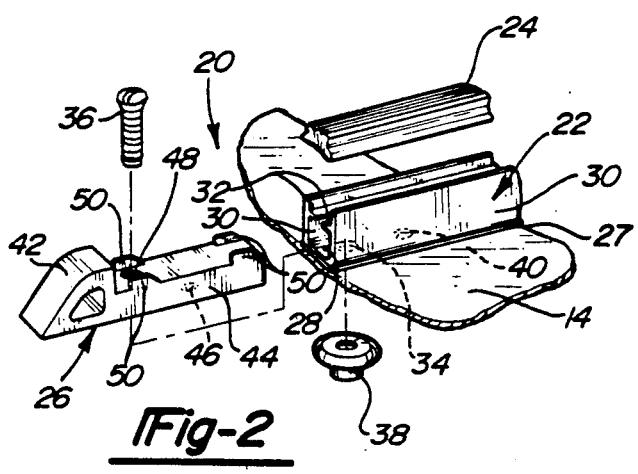
FIG. 2 is an exploded perspective of a first embodiment of the slat of the present invention.
Figure 3:
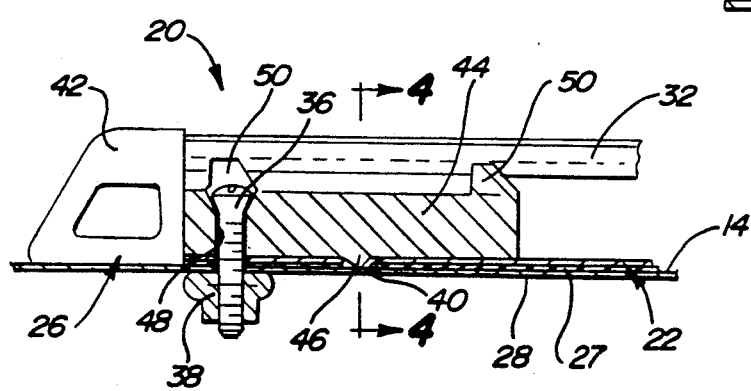
FIG. 3 is a partial cross-sectional perspective of the first embodiment showing the end piece secured within the slat body.

In the first embodiment shown in FIGS. 2 and 3, the end piece 26 includes a body portion 42, which may incorporate the tie loop and is disposed outside of the slat body 22 upon assembly, and a tongue portion 44 extending from the outer body portion 42 and adapted to be matingly received within the end of the slat body 22 as shown in FIG. 3. The tongue portion 44 is provided with boss means in the form of a downwardly depending boss 46 formed on the underside of the tongue portion 44. The boss 46 will be received in the opening 40 of the base wall 28 upon mating insertion of the end piece 26 into the slat body 22 thereby preventing inadvertent removal of the end piece 26 therefrom. The boss 46 is narrower than the opening 40 yet the longitudinally outer lateral edge of the boss 46 will engage the longitudinally outer lateral edge of the opening 40 to retard withdrawal of the end piece 26 from within the slat body 22. Nevertheless, the end piece 26 may be withdrawn by pressing the boss 46 to compress the tongue portion 44 within the slat 20 to a sufficient amount to allow the boss 46 to move over the edge of the opening 40. The curved opening 40 of FIG. 5 allows the boss 46 to travel or pivot along the curved lateral edges thereby ensuring that lateral movement of the end piece 26 is not retarded by the opening 40. As a result, the end piece 26 can be properly aligned within the slat body 22.

To facilitate mounting of the slat 20 to the vehicle surface 14, the tongue portion 44 of the end piece 26 is provided with a vertical throughbore 48 adapted to align coaxially with the aperture 34 in the base wall 28 upon insertion of the end piece 26 into the slat body 22. Accordingly, once the slat 20 is pre-assembled, the fastener 36 may be fed through the bore 48, aperture 34 and the vehicle surface 14 to engage the well nut 38 and secure the slat 20 to the vehicle. However, in order to maintain proper alignment of the end piece 26 within the slat body 22 such that the fastener 36 may be immediately secured, means must be provided to prevent shifting or rotation of the end piece 26 within the slat body 22. Such means will also prevent rotation of the end piece 26 about the fastener 36 even once the slat 20 is secured to the vehicle surface 14 eliminating any misalignment appearance which can detract from the aesthetics of the vehicle and the carrier. Because of the relative diameter of the throughbore 48 with respect to the fastener 36 and the greater width of the opening 40 relative to the width of the boss 46, the end piece 26 would have a tendency to rotate if means for preventing misalignment were not provided.

Figure 4:
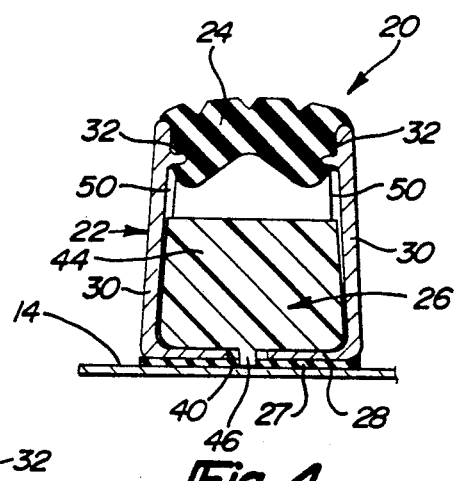
FIG. 4 is a cross-sectional perspective of the first embodiment of the present invention taken along lines 4.4 of FIG. 3.

The tongue portion 44 of the end piece 26 is provided with flange means in the form of flange members 50 extending upwardly from the tongue portion 44. Preferably, at least one flange 50 is provided along both sides of the tongue portion although multiple flanges 50 can be formed on each side as shown in FIG. 2. The flanges 50 extend upwardly to engage the underside of the retaining shoulders 32 of the slat body 22 as best shown in FIG. 4. By providing at least one flange 50 on each side, alignment of the end piece 26 within the slat body 22 is maintained since the underside of the shoulders 32 act as grooves which receive and guide the flanges 50.

In a second embodiment of the slat 20 shown in FIGS. 7 through 9, the throughbore 148 is formed coaxially with the boss 146 and therefore the base wall 128 of the slat body 122 has only one opening 134 formed proximate the end thereof. The single opening 134 receives both the fastener and the boss 146. Alignment of the end piece 126 within the slat body 122 is maintained by flanges 150 extending upwardly from both sides of the tongue portion 144 to engage the retaining shoulders 132.

The slat 20 of the present invention is preassembled to reduce the number of components which must be assembled by the manufacturer or other purchaser. To pre-attach the end-piece 26, the tongue portion 44 is inserted into the end of the slat body 22 and the flanges 50 are aligned with the shoulders 32. The end piece 26 is inserted until the outer body portion 42 abuts the end of the slat body 22. When it becomes necessary to mount the slat 20 to the vehicle surface 14, the fastener 36 is placed through the bore 48 and aperture 34 to engage the well nut 38. Once the slat 20 is mounted, the rub strip 24 can be positioned within the channel between the shoulders 32 to cover the fasteners and related hardware.

The foregoing detailed description has been given for clearness of understanding only and no unnecessary limitations should be understood therefrom as some modifications will be obvious to those skilled in the art without departing from the scope and spirit of the appended claims.

We claim:

1. An article carrier for a vehicle, said article carrier comprising:
    a load-bearing slat constructed to be mounted on a vehicle surface, said slat including a base wall, two side walls extending upwardly from said base wall to form a channel, and retaining shoulders formed at the upper end of said side walls for receiving a rub strip within said channel; and
    an end piece matingly received within at least one end of said slat, said end piece having an outer body portion and a tongue portion integrally formed with said slat body portion, said tongue portion received within said at least one end of said slat;
    said tongue portion of said end piece including at least two flanges extending upwardly from opposite sides of said tongue portion, said flanges extending along a portion of the length of said tongue portion, said flanges engaging the underside of said retaining shoulders of said side walls to prevent rotation and misalignment of said end piece within the end of said slat; and
    said tongue portion of said end piece including downwardly depending boss means formed on the underside of said tongue portion and said base wall of said slat including an opening for receiving said boss means of said tongue portion upon insertion of said tongue portion within said slat, said slat opening having a longitudinally outer lateral edge which cooperates with a longitudinally outer edge of said boss means to prevent inadvertent withdrawal of said tongue portion from said slat, said slat opening having a width substantially greater than the width of said boss means such that the cooperating engagement of said boss means with said slat opening does not prevent alignment of said end piece within the slat.

2. The article carrier as defined in claim 1 wherein said base wall of said slat includes a second opening proximate one end of said slat and said tongue portion of said end piece includes a throughbore adapted to be coaxially aligned with said second opening when said tongue portion is inserted into the end of said slat, said throughbore and second opening adapted to receive a fastener to secure said slat to the vehicle surface.

3. The article carrier as defined in claim 1 wherein said slat opening has a pair of curved lateral edges, the longitudinally outer curved edge cooperating with said longitudinally outer edge of said boss means whereby said boss means may rotate along said curved lateral edge.

4. The article carrier as defined in claim 1 wherein said at least two flange members extending upwardly from said tongue portion extend substantially perpendicular to said tongue portion, said flange members forming an upward extension of a portion of the side walls of said tongue portion, a pair of flange members formed at the end of said tongue portion remote from said outer body portion.

5. In an article carrier having at least one load-bearing slat mountable to a vehicle surface, the slat including a channel-shaped slat body having a base wall, two side walls extending upwardly from said base wall to form the channel, and retaining shoulders formed at the upper ends of the side walls for retaining a rub strip, the slat body having an aperture proximate one end of the slat body for receiving fastening means, an integral end piece adapted to be matingly received within an end of the slat body, the end piece having an outer body portion and a tongue portion, the tongue portion being received within the slat body and including a throughbore adapted to be coaxially aligned with the aperture within the base wall of the slat body, and fastening means extending through the throughbore of the end piece and the aperture of the base wall to secure the slat to the vehicle surface, the improvement comprising:
    a pair of flanges extending upwardly from opposite sides of the tongue portion of the end piece engageable with the underside of the retaining shoulders of the slat body to prevent rotation of the end piece about the throughbore and aperture thereby maintaining longitudinal alignment of the end piece within the slat body, said flanges formed on the tongue portion remote from the outer body portion and having a length less than the length of the tongue portion; and
    boss means depending downwardly from the underside of the tongue portion, said boss means cooperatingly received within an opening formed in the base wall of the slat body to prevent inadvertent withdrawal of the end piece from the slat body, said opening having a pair of lateral edges and a pair of longitudinal edges, said longitudinal edges spaced apart a distance greater than the width of said boss means within said opening, said longitudinally outer lateral edge of said opening engaging a longitudinally outer edge of said boss means to retard withdrawal of the end piece from the slat body.

6. The article carrier as defined in claim 5 wherein said lateral edges of said opening in the base wall of the slat body are curved such that said boss means may pivot along said curved edges.

* * * * *